US012230871B2

(12) United States Patent
Park et al.

(10) Patent No.: US 12,230,871 B2
(45) Date of Patent: Feb. 18, 2025

(54) MULTI BAND SHARK FIN ANTENNA FOR VEHICLE

(71) Applicant: ACE TECHNOLOGIES CORPORATION, Incheon (KR)

(72) Inventors: Se Young Park, Seoul (KR); Sang Pil Kang, Incheon (KR); Jae Il Sim, Incheon (KR); Jin Kyu Hwang, Incheon (KR)

( * ) Notice: Subject to any disclaimer, the term of this patent is extended or adjusted under 35 U.S.C. 154(b) by 132 days.

(21) Appl. No.: 17/890,011

(22) Filed: Aug. 17, 2022

(65) Prior Publication Data

US 2023/0058867 A1 Feb. 23, 2023

(30) Foreign Application Priority Data

Aug. 23, 2021 (KR) ........................ 10-2021-0111045

(51) Int. Cl.
*H01Q 1/32* (2006.01)
*H01Q 1/38* (2006.01)

(52) U.S. Cl.
CPC ............. *H01Q 1/3275* (2013.01); *H01Q 1/38* (2013.01)

(58) Field of Classification Search
CPC ........ H01Q 1/3275; H01Q 1/38; H01Q 21/28; H01Q 5/307; H01Q 9/42; H01Q 1/241; H01Q 7/06; H01Q 21/24
See application file for complete search history.

(56) References Cited

U.S. PATENT DOCUMENTS 9,178,272 B2 * 11/2015 Chakam ............... H01Q 1/3275
10,056,686 B2 * 8/2018 Park ......................... H01Q 1/32
10,770,796 B2 * 9/2020 Miura .................... H01Q 23/00
11,063,346 B2 * 7/2021 Yang .................... H01Q 1/3275
2019/0280372 A1 * 9/2019 Terashita ................ H01Q 1/32
2020/0194882 A1 * 6/2020 Kim ..................... H01Q 1/3208

FOREIGN PATENT DOCUMENTS

KR 10-2012-0086152 A 8/2012
KR 10-2192766 B1 12/2020
WO 2009065806 A1 5/2009

* cited by examiner

*Primary Examiner* — Seung H Lee

(57) ABSTRACT

A multi-band shark fin antenna for a vehicle comprises: a base; a substrate coupled to an upper portion of the base and on which feed lines are formed; and a first antenna frame coupled on the substrate and to which a plurality of radiators are coupled, wherein the first antenna frame comprises: a first radiator coupling part to which a first radiator is coupled; and a first support extending from the first radiator coupling part and supporting the first radiator coupling part, wherein an antenna coil is coupled to an outer circumferential surface of the first support, and the antenna coil is electrically connected to the first radiator.

19 Claims, 15 Drawing Sheets

MULTI BAND SHARK FIN ANTENNA FOR VEHICLE

CROSS-REFERENCE TO RELATED APPLICATIONS

This application claims priority under 35 U.S.C. § 119 to, and the benefits of, Korean Patent Application No. 10-2021-0111045, filed on Aug. 23, 2021, in the Korean Intellectual Property Office, the disclosure of which is incorporated herein in its entirety by reference.

BACKGROUND

1. Technical Field

The present disclosure relates to an antenna, more particularly to a multi-band shark fin antenna for a vehicle.

2. Description of the Related Art

As communication systems develop, communication services provided through vehicles are also diversifying. Conventional vehicles generally received FM/AM signals, but in recent years, various types of services such as DMB/DAB, GNSS, 5G, and LTE are required to be provided through vehicles.

As services provided through vehicles have diversified, there was a limit to transmitting and receiving signals of various bands only with a single antenna, and for this reason, a shark fin antenna mounted on the roof of the vehicle was used.

As a radiator of the shark fin antenna, a radiator formed by etching a metal pattern on a PCB was mainly used. It is a structure in which a base substrate is mounted on a shark fin antenna, a PCB is vertically coupled to the base substrate, and a metal pattern formed on the vertically coupled PCB is used as a radiator.

However, there was a limitation in transmitting and receiving signals of various bands only with the radiator of this structure and there was a problem in that the manufacturing cost also increased. As various types of radiators were arranged in a limited space, interference between the radiators occurred, and the interference between the radiators became a major cause of performance degradation of the shark fin antenna.

In addition, as a plurality of radiators were all formed on vertically coupled PCBs, there was a problem in that a large number of PCBs were required and it was difficult to reduce the cost in order to secure an appropriate arrangement structure.

SUMMARY

An object of the present disclosure is to propose a multi-band shark fin antenna that can reduce manufacturing cost by not using a PCB as a radiator.

Another object of the present disclosure is to propose a multi-band shark fin antenna that can secure the degree of isolation between the radiators when a plurality of radiators are used.

According to an embodiment of the present disclosure, conceived to achieve the objectives above, a multi-band shark fin antenna is provided, the antenna comprising: a base; a substrate coupled to an upper portion of the base and on which feed lines are formed; and a first antenna frame coupled on the substrate and to which a plurality of radiators are coupled, wherein the first antenna frame comprises a first radiator coupling part to which a first radiator is coupled, and a first support extending from the first radiator coupling part and supporting the first radiator coupling part, wherein an antenna coil is coupled to an outer circumferential surface of the first support, and the antenna coil is electrically connected to the first radiator.

The antenna coil includes a coil part, an upwardly extending part extending vertically from the coil part in an upward direction, and a downwardly extending part extending vertically from the coil part in a downward direction.

A hole is formed in the first radiator coupling part, the upwardly extending part passes through the hole and protrudes above the first radiator coupling part, and the protruding upwardly extending part is coupled to the first radiator through soldering.

A fixing hook is formed at a lower portion of the first support, a lower end of the coil part has a straight structure, and a straight portion of the coil part is coupled to a groove of the fixing hook.

A through hole and a plurality of heat transfer prevention holes around the through hole are formed in a predetermined area of the first radiator.

The first antenna frame may further include a second support disposed on the left side of the first support and coupled to the substrate, and a third support disposed on the right side of the first support and coupled to the substrate.

A second radiator is coupled to the side of the second support, and a fixing protrusion is respectively formed on both sides of the second radiator.

A guide groove for inserting the second radiator is formed in the second support, and the fixing protrusions of the second radiator are supported by the guide groove.

A third radiator is coupled to the side of the third support.

A support leg extending in a direction parallel to the substrate is formed in at least one of the first support to the third support, and a screw hole is formed in the support leg.

The thickness of the support leg is the same as that of the substrate, a region corresponding to the support leg is removed from the substrate, and the support leg is inserted into the removed region of the substrate and then coupled to the base.

The multi-band shark fin antenna may further include: a second antenna frame coupled on the substrate and to which at least one radiator is coupled; and a chip antenna coupled on the substrate, wherein the chip antenna is disposed between the first antenna frame and the second antenna frame.

According to another aspect of the present disclosure, a multi-band shark fin antenna is provided, the antenna comprising: a base; a substrate coupled to an upper portion of the base and on which feed lines are formed; a first antenna frame coupled on the substrate and to which a plurality of radiators are coupled; a second antenna frame coupled on the substrate and to which at least one radiator is coupled; and a chip antenna coupled on the substrate, wherein the chip antenna is disposed between the first antenna frame and the second antenna frame.

According to the present disclosure, there are advantages in that since PCB is not used as a radiator, manufacturing cost can be reduced, and when a plurality of radiators are used, the degree of isolation between the radiators can be secured.

DETAILED DESCRIPTION

Figure 1:
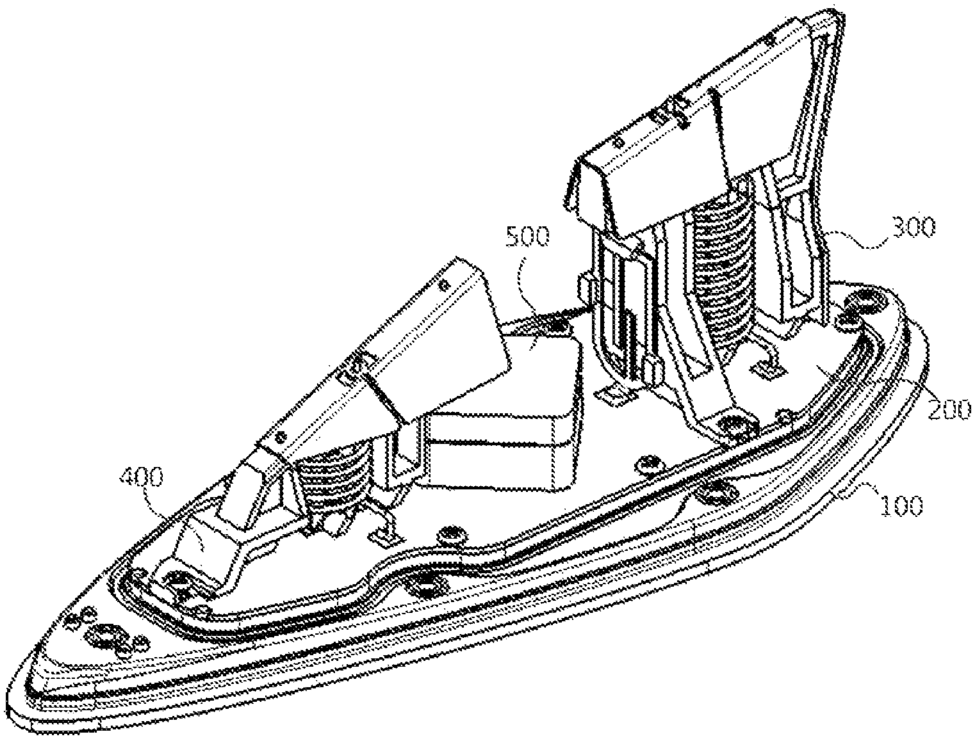
FIG. 1 is a perspective view of a multi-band shark fin antenna for a vehicle according to an embodiment of the present disclosure, as viewed from a first direction.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 2:
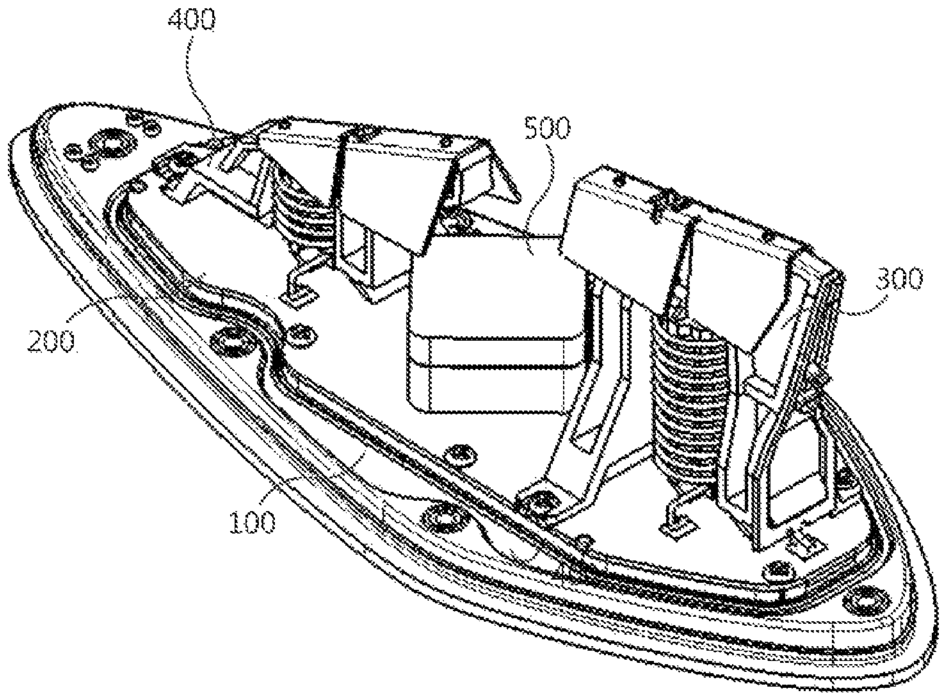
FIG. 2 is a perspective view of a multi-band shark fin antenna for a vehicle according to an embodiment of the present disclosure, as viewed from a second direction.

FIG. 1 is a perspective view of a multi-band shark fin antenna for a vehicle according to an embodiment of the present disclosure, as viewed from a first direction, and FIG. 2 is a perspective view of a multi-band shark fin antenna for a vehicle according to an embodiment of the present disclosure, as viewed from a second direction.

Referring to FIG. 1 and FIG. 2, the multi-band shark fin antenna for a vehicle according to an embodiment of the present disclosure includes a base 100, a substrate 200, a first antenna frame 300, a second antenna frame 400 and a chip antenna 500. As the chip antenna 500, a ceramic patch type antenna is generally used.

In FIG. 1 and FIG. 2, a housing for protecting elements shown in FIG. 1 and FIG. 2 is omitted, and a shark fin-shaped housing (not shown) may be coupled to the shark fin antenna according to an embodiment of the present disclosure.

The base 100, together with a housing, functions to protect the elements of the antenna according to an embodiment of the present disclosure. The elements of the antenna according to an embodiment of the present disclosure are fixed on the base.

A substrate 200 is placed on the base 100. As an example, the substrate 200 may be a PCB, but is not limited thereto. A circuit for feeding the antenna may be formed on an upper portion of the substrate 200, and a ground plane may be formed on a lower portion of the substrate 200. For example, feed lines for providing a feed signal are formed on the substrate 200, and the formed feed lines are electrically connected to radiators coupled to the first antenna frame 300 and the second antenna frame 400 to provide a feed signal to the radiators.

The first antenna frame 300 is fixed on the substrate 200. The first antenna frame 300 is a frame for fixing a plurality of radiators, and the first antenna frame 300 is made of a dielectric material such as plastic.

In recent years, a shark fin antenna for a vehicle has been required to have radiators of various bands built in together. As various services are provided through vehicle communication, services such as AM/FM, DMB/DAB, GNSS, 5G, and LTE are all required for vehicle communication. It is not easy to embed all of these various bands of radiators in the shark fin antenna, and the first antenna frame 300 is used to embed a plurality of radiators in the shark fin antenna in an appropriate structure.

According to an embodiment of the present disclosure, three radiators of an AM/FM radiator, a 5G radiator, and an LTE radiator may be coupled to the first antenna frame 300. Of course, this is an example, and it will be apparent to those skilled in the art that radiators of other various service bands may be coupled to the first antenna frame 300.

The second antenna frame 400 is also fixed on the substrate 200, and a radiator may also be coupled to the second antenna frame 400. The radiator coupled to the second antenna frame 400 has a service band different from that of the radiator coupled to the first antenna frame 300. Of course, a plurality of radiators may also be coupled to the second antenna frame 400. For example, a radiator of the DMB band may be coupled to the second antenna frame 400.

A chip antenna 500 may be disposed between the first antenna frame 300 and the second antenna frame 400. According to an embodiment of the present disclosure, the chip antenna 500 may be an antenna for a GPS band.

According to a preferred embodiment of the present disclosure, the second antenna frame 400 is disposed at the front of the shark fin antenna, the first antenna frame 300 is disposed at the rear of the shark fin antenna, and the chip antenna 500 is disposed between the first antenna frame 300 and the second antenna frame 400.

Since the shark fin antenna has a structure in which the height increases from the front to the rear, the chip antenna 500 is typically disposed most forward. However, there was a problem that, when radiators of a plurality of service bands were embedded in one shark fin antenna, the degree of isolation between the radiators was not properly secured.

The chip antenna has a different shape from radiators coupled to the first and second antenna frames 300 and 400, and in order to ensure adequate isolation between radiators, the chip antenna is preferably disposed between the first and second antenna frames 300 and 400. That is, by disposing the chip antenna 500 between the first antenna frame 300 and the second antenna frame 400, radiators coupled to the first antenna frame 300 and radiators coupled to the second antenna frame 400 are spaced apart.

Since the chip antenna and the radiators coupled to the antenna frames are not relatively significantly affected by each other, the most appropriate degree of isolation can be ensured when the chip antenna 500 is disposed between the two antenna frames 300 and 400.

One of the features of the present disclosure lies in a structure of the first antenna frame 300. According to an embodiment of the present disclosure, three radiators are coupled to the first antenna frame 300, and in particular, a radiator of an AM/FM band, a low-band, is coupled.

A size of a radiator is inversely proportional to a frequency band of an antenna, and the lower the band of the antenna, the larger the size of the radiator is required. The present disclosure proposes a first antenna frame structure in which a radiator of a low band such as AM/FM and radiators of another band can be effectively coupled.

Figure 3:
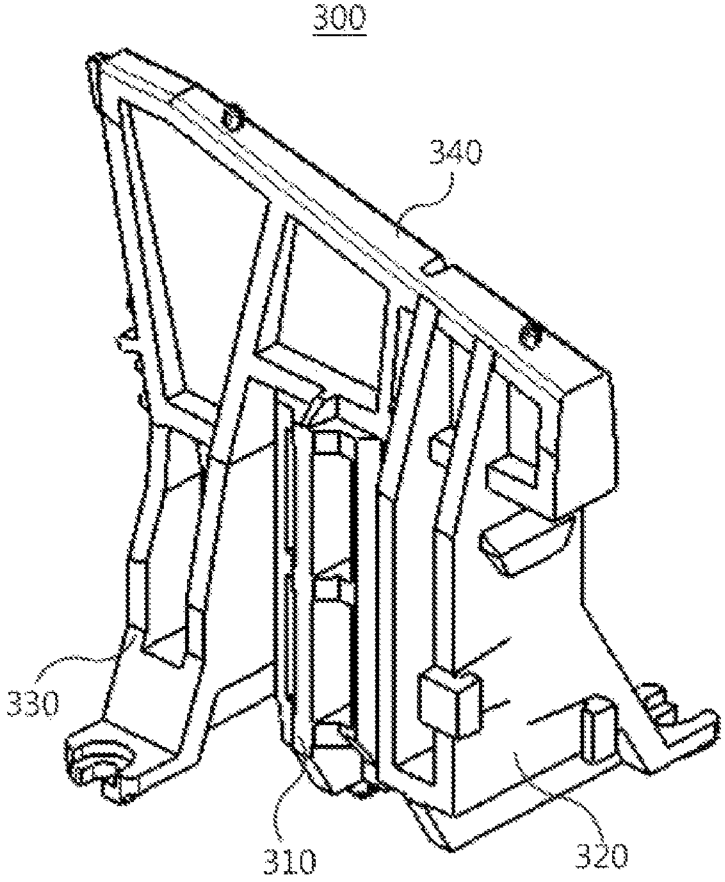
FIG. 3 is a perspective view of a first antenna frame of a multi-band shark fin antenna for a vehicle according to an embodiment of the present disclosure.
Figure 4:
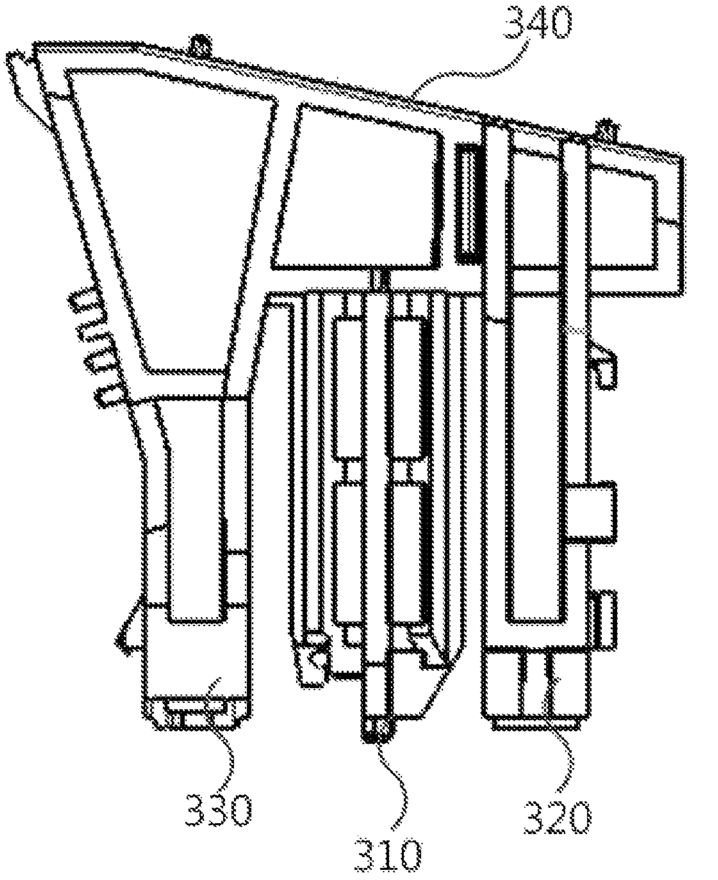
FIG. 4 is a front view of a first antenna frame of a multi-band shark fin antenna for a vehicle according to an embodiment of the present disclosure.
Figure 5:
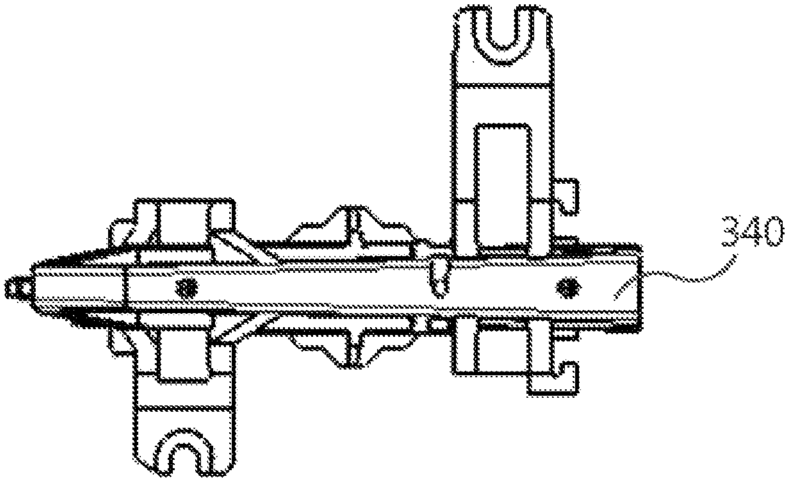
FIG. 5 is a plan view of a first antenna frame of a multi-band shark fin antenna for a vehicle according to an embodiment of the present disclosure.

FIG. 3 is a perspective view of a first antenna frame of a multi-band shark fin antenna for a vehicle according to an embodiment of the present disclosure, FIG. 4 is a front view of a first antenna frame of a multi-band shark fin antenna for a vehicle according to an embodiment of the present disclosure, and FIG. 5 is a plan view of a first antenna frame of a multi-band shark fin antenna for a vehicle according to an embodiment of the present disclosure.

The first antenna frame 300 shown in FIGS. 3 to 5 is the first antenna frame 300 in a state in which radiators are not coupled.

Referring to FIGS. 3 to 5, the first antenna frame 300 according to an embodiment of the present disclosure may include a first support 310, a second support 320, a third support 330 and a first radiator coupling part 340.

A first radiator is coupled to the first radiator coupling part 340. A detailed structure of the first radiator will be described with reference to other drawings. The first radiator coupling part 340 may have an inclined structure in which an upper end thereof is inclined. Since the outer shape of the shark fin antenna has a structure in which the height increases from the front to the rear, the first radiator coupling part 340 also has a structure in which the height increases from the front to the rear.

Three supports 310, 320, 330 are coupled to the first radiator coupling unit 340, and each of the supports 310, 320 and 330 is coupled to the substrate 200 to fix the first antenna frame 300 on the substrate 200.

An antenna coil functioning as a radiator together with the first radiator is coupled to the first support 310 located in the center among the three supports. A detailed structure of the antenna coil and the coupling structure with the first support will be described with reference to other drawings.

The second support 320 is formed on the right side of the first support 310, and is disposed parallel to the first support 310 while being spaced apart from the first support 310. A second radiator is coupled to one side of the second support 320.

The third support 330 is formed on the left side of the first support 310, and is disposed parallel to the first support 310 while being spaced apart from the first support. A third radiator is coupled to one side of the third support 330.

In the present disclosure, three parallel supports 310, 320 and 330 are formed on the first antenna frame 300 so that elements for radiation are coupled to each of the supports 310, 320 and 330.

Conventional shark fin antennas used a structure in which on a substrate, another substrate was vertically disposed and then a radiator was connected to the vertical substrate. However, a structure in which a plurality of substrates were vertically disposed on the base substrate caused high manufacturing cost and performance degradation in various aspects such as degree of isolation.

In order to solve this problem, in the present disclosure, the first antenna frame 300 having a plurality of supports is coupled on a substrate, and a radiator is coupled to each support.

In particular, the first antenna frame 300 of the present disclosure has a structure suitable for realizing an AM/FM radiator of a low-band. An AM/FM radiator of a low-band requires a long length, and conventionally, in order to secure the length of the radiator, after a PCB is erected vertically, a metal pattern of a meander formed on the PCB is used as a part of the radiator.

As described above, there were problems that a structure for forming a metal pattern on a PCB was a high-cost structure, and that it could not provide adequate performance.

In order to solve this problem, in the present disclosure, an antenna coil is coupled to the first support 310 of the first antenna frame 300, and the antenna coil and the first radiator are electrically connected to extend an electrical length of the first radiator. The first radiator is used as a low-band radiator such as an AM/FM band.

Figure 6:
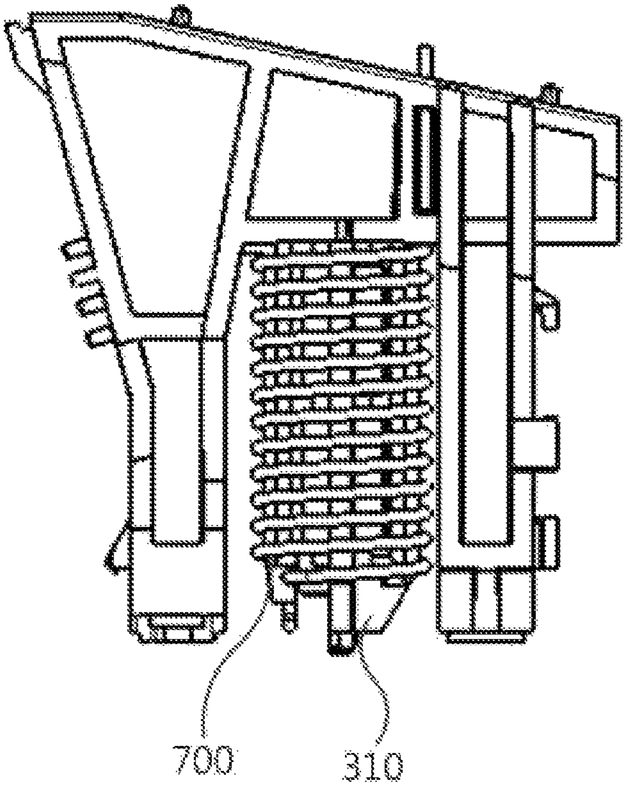
FIG. 6 shows a structure in which an antenna coil is coupled to a first support in a first antenna frame according to an embodiment of the present disclosure.
Figure 7:
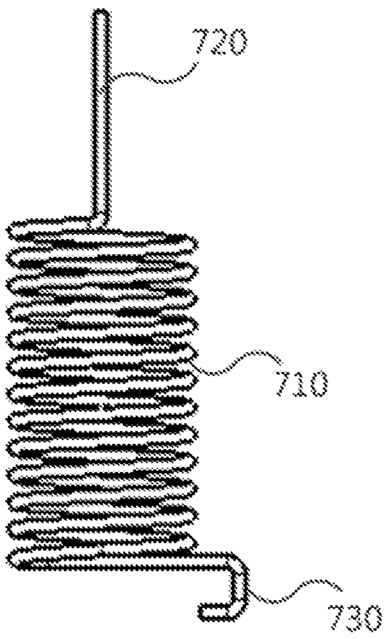
FIG. 7 shows an antenna coil according to an embodiment of the present disclosure.
Figure 8:
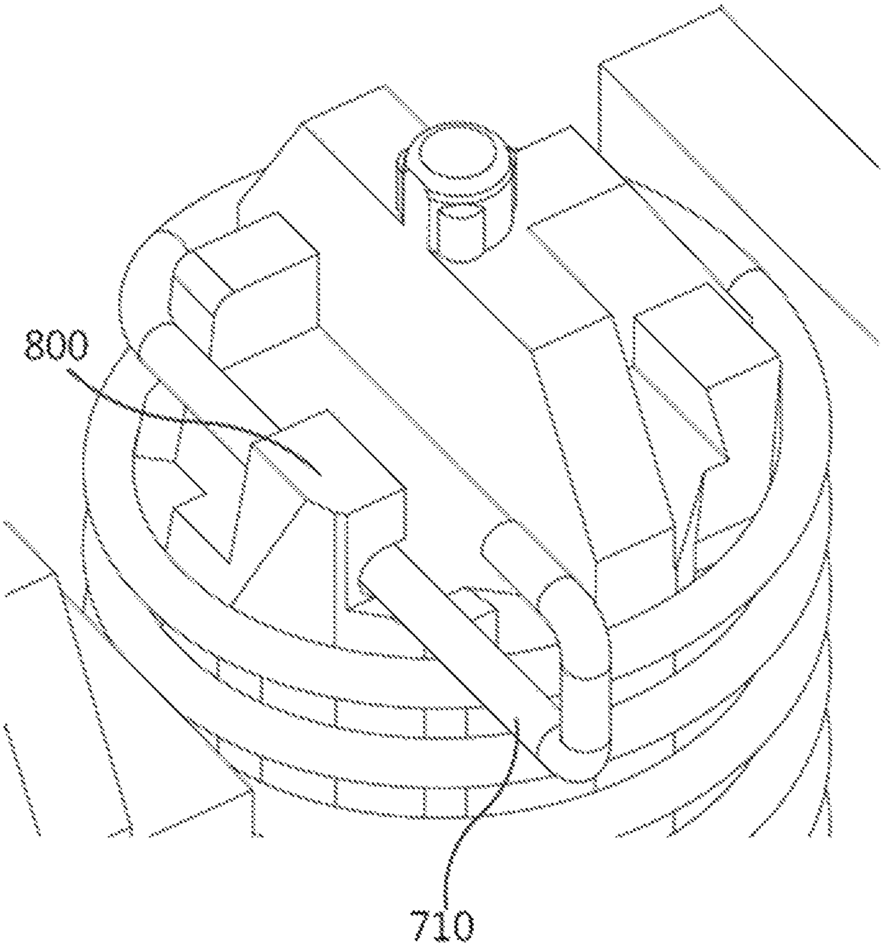
FIG. 8 shows state in which an antenna coil is coupled to a fixing hook formed at a lower portion of a first support.

FIG. 6 shows a structure in which an antenna coil is coupled to a first support in a first antenna frame according to an embodiment of the present disclosure, FIG. 7 shows an antenna coil according to an embodiment of the present disclosure, and FIG. 8 shows state in which an antenna coil is coupled to a fixing hook formed at a lower portion of a first support.

Referring to FIG. 7, the antenna coil 700 according to an embodiment of the present disclosure includes a coil part 710, an upwardly extending part 720 and a downwardly extending part 730. The coil part 710 has a coil shape of a general spiral structure. The upwardly extending part 720 extends in an upward vertical direction from the upper end of the coil part 710. The downwardly extending part 730 extends in a downward vertical direction from the lower end of the coil part 710.

Referring to FIG. 6, the antenna coil 700 is coupled to an outer circumferential surface of the first support 310. The cross-section of the first support 310 has a circular shape such that the antenna coil 700 can be coupled thereto. The antenna coil 700 may be coupled in such a way that it is inserted into the first support 310.

The upwardly extending part 720 of the antenna coil 700 protrudes above the first radiator coupling part 340 through a hole formed in the first radiator coupling part 340. The upwardly extending part 720 of the antenna coil 700 is electrically coupled to the first radiator and functions as a part of the radiator for the low band.

The downwardly extending part 730 of the antenna coil 700 is coupled to the substrate 200, and receives a feed signal from a feed line formed on the substrate 200.

In the present disclosure, through a structure in which the antenna coil 700 is coupled to the first support 310 of the first antenna frame 300, and the antenna coil 700 and the first radiator function together as a radiator, cost is reduced and stable characteristics are secured.

Meanwhile, a structure in which the antenna coil 700 is inserted into the first support 310 alone cannot maintain a stable coupling structure of the antenna coil 700 and the first support 310. According to a preferred embodiment of the present disclosure, a fixing hook 800 is formed on the bottom part of the first support 310 to fix the antenna coil 700.

Referring to FIG. 8, a lower end of the coil part 710 has a straight structure rather than a coil structure, and the straight portion is inserted into the groove of the fixing hook 800. Since the antenna coil 700 has an elastic force, it is possible to insert it into the groove of the fixing hook 800 by manipulation of an instrument or a worker.

Figure 9:
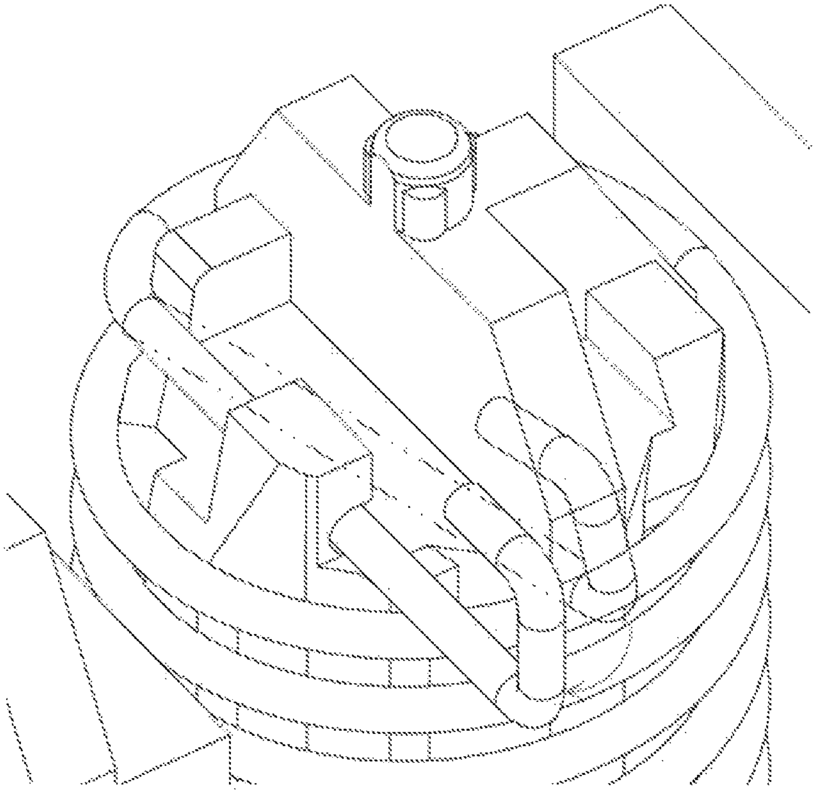
FIG. 9 shows an operation of fixing a lower end of a coil to a fixing hook in a first support according to an embodiment of the present disclosure.

FIG. 9 shows an operation of fixing a lower end of a coil to a fixing hook in a first support according to an embodiment of the present disclosure.

As shown in FIG. 9, the straight portion of the coil part 710 may be moved sideways and then fixed to the groove of the fixing hook 800.

As such, by fixing the lower end of the coil part 710 to the fixing hook 800, it becomes possible to prevent the coil fixed to the first support 310 from descending. In addition, it becomes possible to prevent the coil from rotating while inserted into the first support 310 due to shaking or the like of the antenna.

Figure 10:
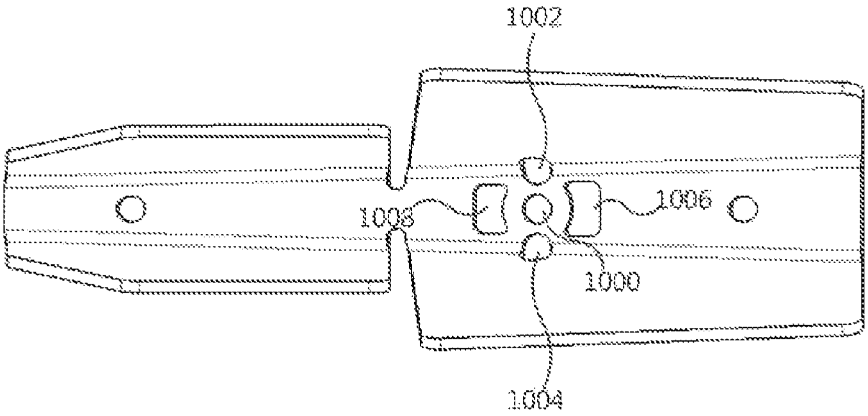
FIG. 10 shows a plan view of a first radiator according to an embodiment of the present disclosure.

FIG. 10 shows a plan view of a first radiator according to an embodiment of the present disclosure. FIG. 10 shows the first radiator mounted on the upper region of the first radiator coupling part 340 in the first antenna frame 300.

Referring to FIG. 10, a through hole 1000 is formed in a predetermined area of the first radiator corresponding to the hole formed in the first radiator coupling part 340, and the upwardly extending part 720 of the antenna coil protrudes through the through hole 1000 and is coupled to the first radiator.

Meanwhile, a plurality of heat transfer prevention holes 1002, 1004, 1006 and 1008 are formed around the through hole 1000. According to an embodiment of the present disclosure, the heat transfer prevention holes 1002, 1004, 1006 and 1008 may be formed in each of upper, lower, left and right sides of the through hole 1000 centering on the through hole 1000. Of course, it will be apparent to those skilled in the art that the number of heat transfer prevention holes and the arrangement of the heat transfer prevention holes may be changed according to a required environment.

The heat transfer prevention holes 1002, 1004, 1006 and 1008 are formed to minimize heat loss generated during a soldering process. When soldering the first radiator and the upwardly extending part 720 of the antenna coil 700, the soldering time may be increased due to heat loss, and the heat transfer prevention holes 1002, 1004, 1006 and 1008 are formed to prevent a delay in soldering time.

Figure 11:
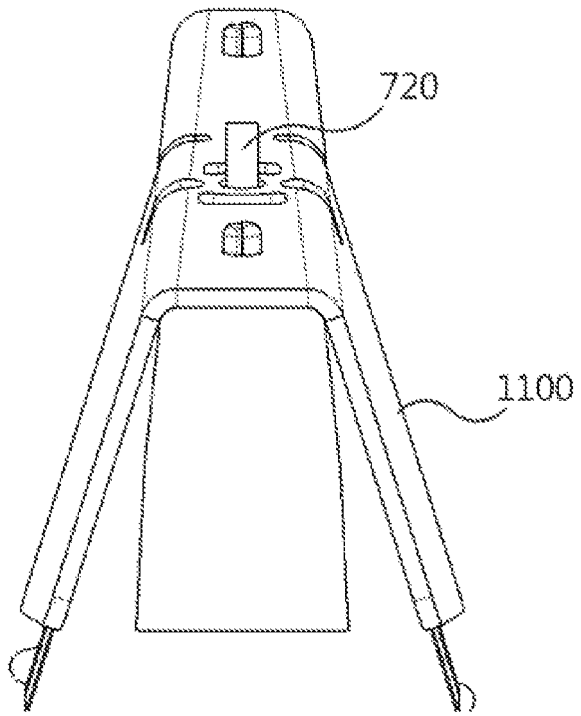
FIG. 11 shows an antenna coil and a first radiator according to an embodiment of the present disclosure, in a state before soldering.

FIG. 11 shows an antenna coil and a first radiator according to an embodiment of the present disclosure, in a state before soldering.

Referring to FIG. 11, the first radiator 1100 has a shape in which a flat plate is bent in a trapezoidal shape. A through hole is formed in the first radiator 1100 so that the upwardly extending part 720 of the antenna coil 700 protrudes through the through hole.

Soldering of the first radiator 1100 and the upwardly extending part 720 of the antenna coil 700 is performed in a state in which the upwardly extending part 720 protrudes through the through hole, and the antenna coil 700 is electrically coupled to the first radiator 1100.

The antenna coil 700 and the first radiator 1100 work together as a radiator, and an electrical length required for the low-band radiator can be secured by the antenna coil 700.

Figure 12:
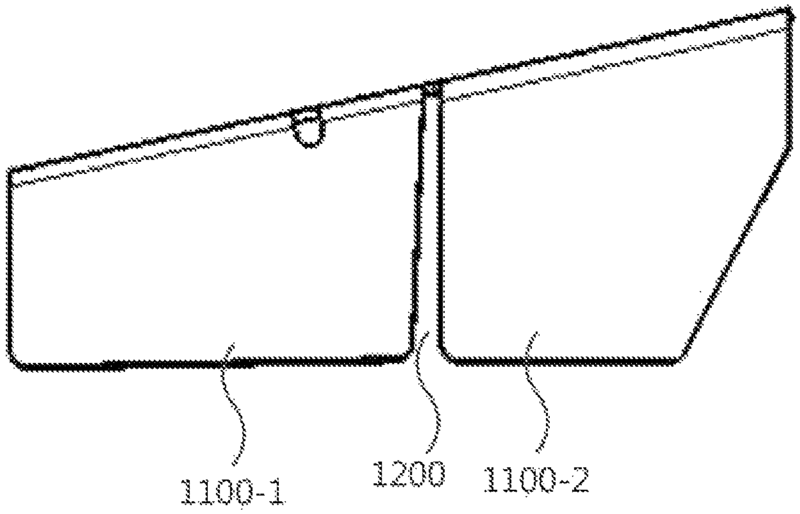
FIG. 12 shows a front view of a first radiator according to an embodiment of the present disclosure.

FIG. 12 shows a front view of a first radiator according to an embodiment of the present disclosure.

Referring to FIG. 12, the first radiator is divided into a first radiating part 1100-1 and a second radiating part 1100-2. Specifically, the first radiating part 1100-1 and the second radiating part 1100-2 are divided by slits 1200 formed on both sides of the first radiator.

The antenna coil 700 has a large inductance component, and a necessary capacitance component can be secured by the slits 1200 formed on the both sides.

Figure 13:
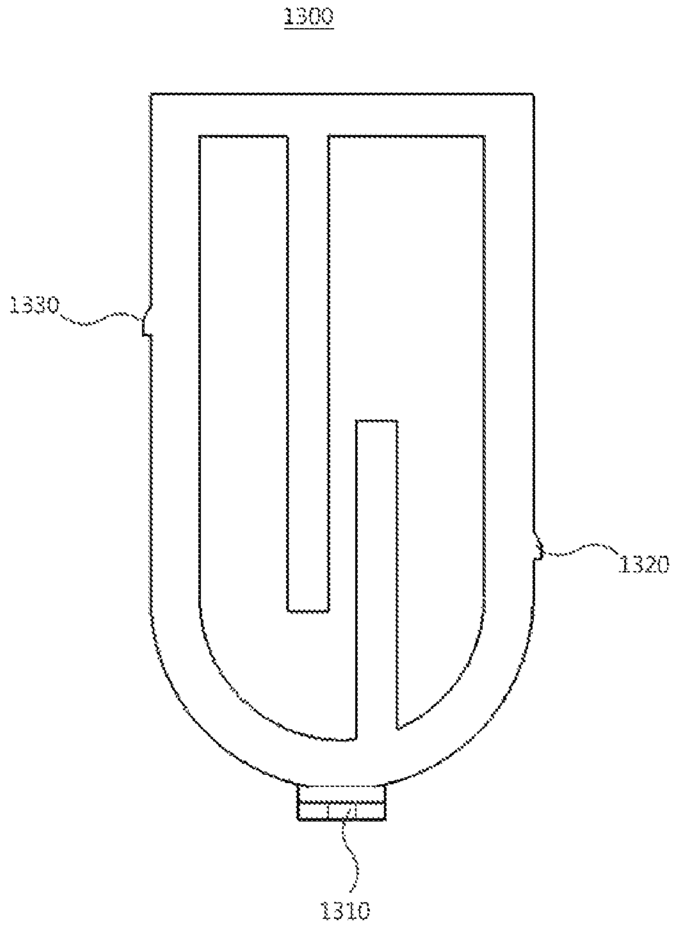
FIG. 13 shows a second radiator according to an embodiment of the present disclosure.

FIG. 13 shows a second radiator according to an embodiment of the present disclosure.

Referring to FIG. 13, a feed point 1310 is formed at a lower end of the second radiator 1300 according to an embodiment of the present disclosure, and is coupled to a feed line of the substrate 200. The second radiator 1300 may have a loop shape, but is not limited thereto.

Fixing protrusions 1320 and 1330 are formed on both sides of the second radiator 1300, and the fixing protrusions prevent the second radiator 1300 from descending after being coupled to the second support 320.

For example, the second radiator 1300 may be a radiator that transmits and receives signals in a 5G band.

Figure 14:
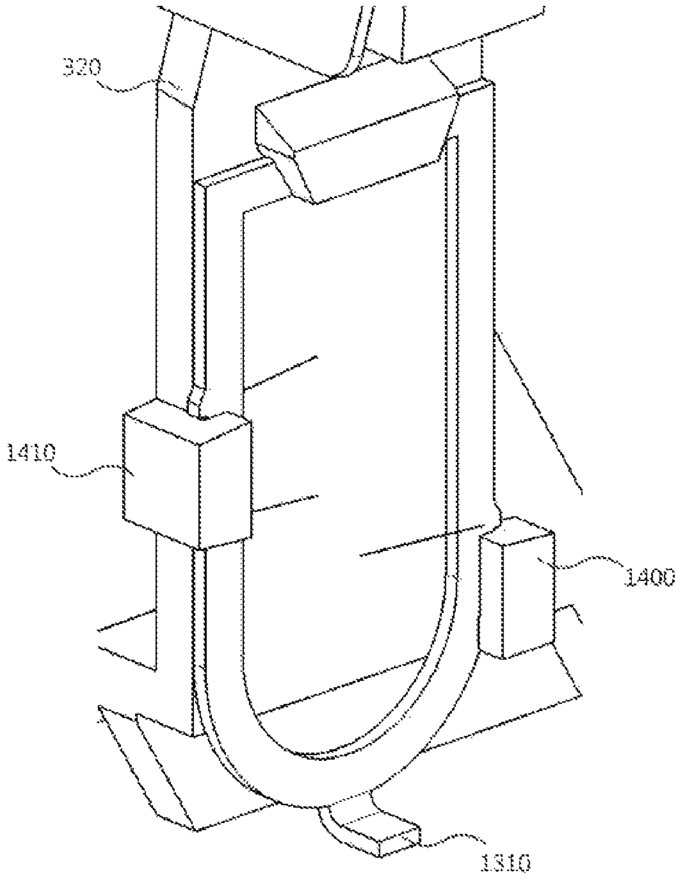
FIG. 14 shows a state in which a second radiator is coupled to the side of a second support, according to an embodiment of the present disclosure.

FIG. 14 shows a state in which a second radiator is coupled to the side of a second support, according to an embodiment of the present disclosure.

Referring to FIG. 14, guide grooves 1400 and 1410 for inserting the second radiator into the second support 320 are formed on both sides of the second support 320. When the insertion of the second radiator 1300 through the guide grooves 1400 and 1410 is completed, the first fixing protrusion 1320 is located on the first guide groove 1400, and the second fixing projection 1330 is located on the second guide groove 1410. As a result, the second radiator 1300 can be supported by the guide grooves 1400 and 1410 to maintain coupling with the second support 320.

Figure 15:
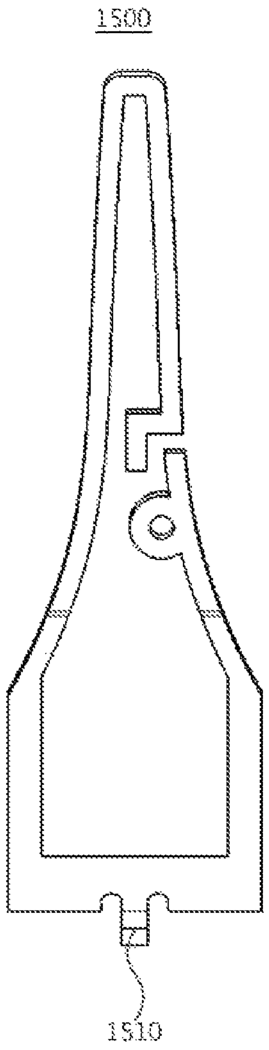
FIG. 15 shows a third radiator according to an embodiment of the present disclosure.

FIG. 15 shows a third radiator according to an embodiment of the present disclosure.

Referring to FIG. 15, the third radiator 1500 according to an embodiment of the present disclosure may have a cutloop structure. A feed point 1510 is also formed at a lower portion of the third radiator and is coupled to a feed line formed on the substrate 200.

For example, the third radiator 1500 may be a radiator that transmits and receives signals in an LTE band.

Figure 16A:
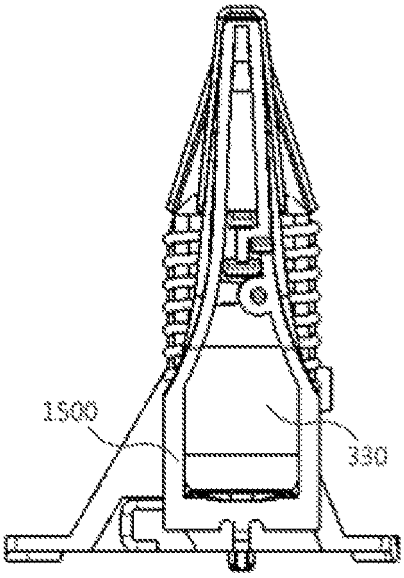
FIGS. 16A and 16B show a state in which a third radiator is coupled to a third support, according to an embodiment of the present disclosure.
Figure 16B:
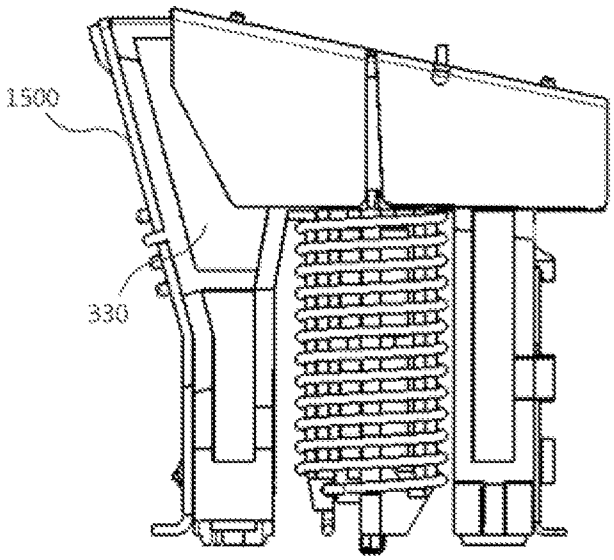

FIGS. 16A and 16B show a state in which a third radiator is coupled to a third support, according to an embodiment of the present disclosure.

FIG. 16A shows a state in which the third radiator 1500 is coupled to the third support 330, as viewed from the front, and FIG. 16B shows a state in which the third radiator 1500 is coupled to the third support 330, as viewed from the side.

Referring to FIGS. 16A and 16B, the third radiator 1500 is coupled to the side of the third support 330, and the side of the third support 330 has an inclined structure.

It will be apparent to those skilled in the art that the third radiator 1500 and the third support 330 may be coupled in various ways.

Figure 17:
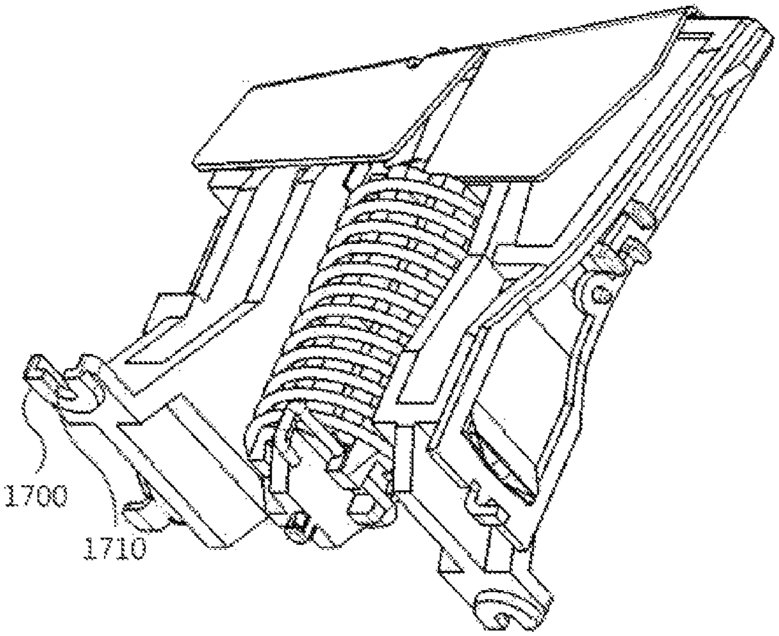
FIG. 17 shows a structure of a first support leg formed on a second support according to an embodiment of the present disclosure.
Figure 18:
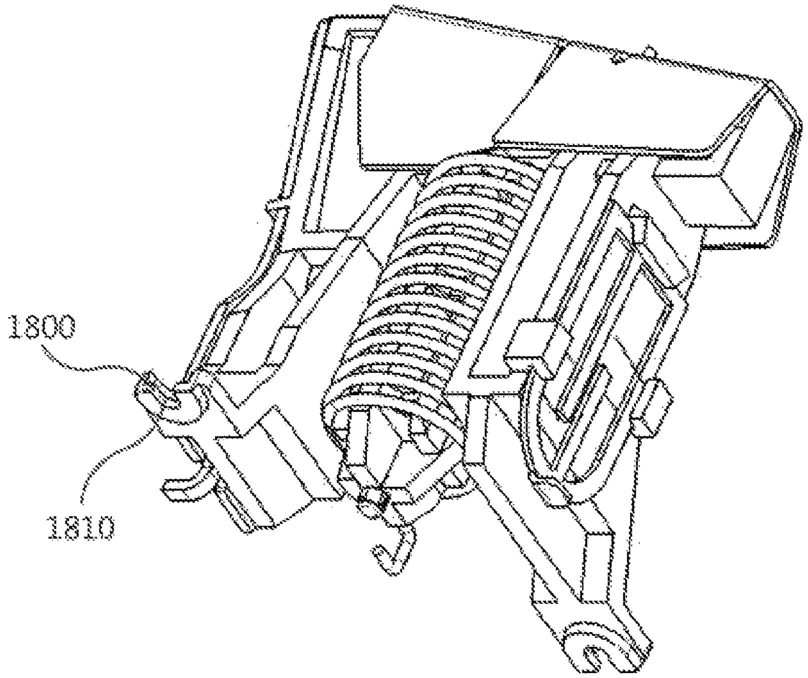
FIG. 18 shows a structure of a second support leg formed on a third support according to an embodiment of the present disclosure.

FIG. 17 shows a structure of a first support leg formed on a second support according to an embodiment of the present disclosure, and FIG. 18 shows a structure of a second support leg formed on a third support according to an embodiment of the present disclosure.

Referring to FIG. 17, the first support leg 1700 formed on the second support 320 is formed in a direction parallel to the substrate by bending one side of the second support 320. A screw hole 1710 is formed in the first support leg 1700. The thickness of the first support leg 1700 is preferably the same as that of the substrate 200.

Referring to FIG. 18, the second support leg 1800 formed on the third support 330 is also formed in a direction parallel to the substrate by bending one side of the third support 330. A screw hole 1810 is also formed in the second support leg 1800, and the thickness of the second support leg 1800 is preferably the same as that of the substrate 200.

Figure 19:
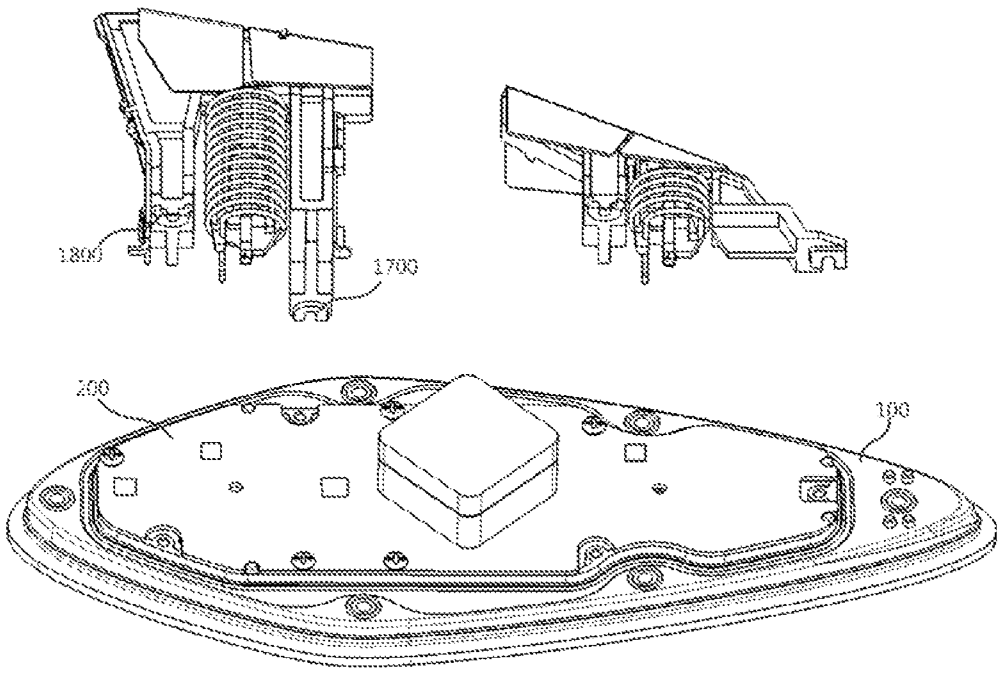
FIG. 19 is a view for explaining coupling of a first antenna frame and a substrate according to an embodiment of the present disclosure.

FIG. 19 is a view for explaining coupling of a first antenna frame and a substrate according to an embodiment of the present disclosure.

Referring to FIG. 19, regions of the substrate corresponding to the first support leg 1700 and the second support leg 1800 are removed corresponding to the shapes of the first support leg 1700 and the second support leg 1800.

The first support leg 1700 and the second support leg 1800 are inserted into the removed regions and coupled to the substrate 200 and the base 100.

Figure 20:
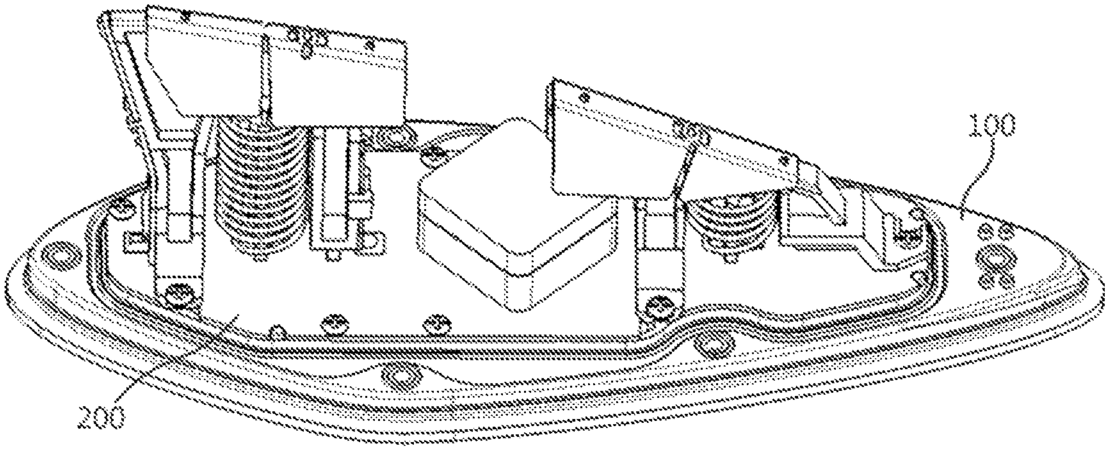
FIG. 20 shows a state in which a first antenna frame, a substrate and a base are coupled according to an embodiment of the present disclosure.

FIG. 20 shows a state in which a first antenna frame, a substrate and a base are coupled according to an embodiment of the present disclosure.

Referring to FIG. 20, the first support leg 1700 and the second support leg 1800 are inserted into the regions from which the substrate has been removed, and then coupled to the substrate 200 and the base 100 through screw coupling.

In a typical antenna for a vehicle, a structure installed on a substrate is primarily coupled to the substrate, and then the substrate and a base are coupled using a separate coupling structure. However, in the present disclosure, in order to avoid such a multi-stage coupling method and reduce manufacturing costs, coupling of the antenna frame, the substrate, and the base is made at once.

Since the first support leg 1700 and the second support leg 1800 have the same thickness as the substrate, they have the same height as the substrate when inserted into the substrate removal region, and a screw thread is formed on the inner circumferential surface of the screw hole, so that the first antenna frame 300, the substrate 200 and the base 100 can be simultaneously coupled through a screw.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A multi-band shark fin antenna, comprising:

a base;

a substrate coupled to an upper portion of the base and on which feed lines are formed; and a first antenna frame coupled on the substrate and to which a plurality of radiators are coupled, wherein the first antenna frame comprises:

a first radiator coupling part to which a first radiator is coupled; and a first support extending from the first radiator coupling part and supporting the first radiator coupling part, wherein an antenna coil is coupled to an outer circumferential surface of the first support, and the antenna coil is electrically connected to the first radiator, wherein the antenna coil includes a coil part, an upwardly extending part extending vertically from the coil part in an upward direction, and a downwardly extending part extending vertically from the coil part in a downward direction, and wherein a hole is formed in the first radiator coupling part, the upwardly extending part passes through the hole and protrudes above the first radiator coupling part, and the protruding upwardly extending part is coupled to the first radiator through soldering.

2. The multi-band shark fin antenna according to claim 1, wherein a fixing hook is formed at a lower portion of the first support, a lower end of the coil part has a straight structure, and a straight portion of the coil part is coupled to a groove of the fixing hook.

3. The multi-band shark fin antenna according to claim 1, wherein a through hole and a plurality of heat transfer prevention holes around the through hole are formed in a predetermined area of the first radiator.

4. The multi-band shark fin antenna according to claim 1, wherein the first antenna frame further includes a second support disposed on right side of the first support and coupled to the substrate, and a third support disposed on left side of the first support and coupled to the substrate.

5. The multi-band shark fin antenna according to claim 4, wherein a second radiator is coupled to one side of the second support, and a fixing protrusion is respectively formed on both sides of the second radiator.

6. The multi-band shark fin antenna according to claim 5, wherein a guide groove for inserting the second radiator is formed in the second support, and the fixing protrusion of the second radiator is supported by the guide groove.

7. The multi-band shark fin antenna according to claim 4, wherein a third radiator is coupled to one side of the third support.

8. The multi-band shark fin antenna according to claim 4, wherein a support leg extending in a direction parallel to the substrate is formed in at least one of the first support to the third support, and a screw hole is formed in the support leg.

9. The multi-band shark fin antenna according to claim 8, wherein a thickness of the support leg is the same as a thickness of the substrate, a region corresponding to the support leg is removed from the substrate, and the support leg is inserted into the removed region of the substrate and then coupled to the base.

10. The multi-band shark fin antenna according to claim 1, wherein the multi-band shark fin antenna further includes:

a second antenna frame coupled on the substrate and to which at least one radiator is coupled; and a chip antenna coupled on the substrate, wherein the chip antenna is disposed between the first antenna frame and the second antenna frame.

11. A multi-band shark fin antenna, comprising:

a base;

a substrate coupled to an upper portion of the base and on which feed lines are formed;

a first antenna frame coupled on the substrate and to which a plurality of radiators are coupled;

a second antenna frame coupled on the substrate and to which at least one radiator is coupled; and a chip antenna coupled on the substrate, wherein the chip antenna is disposed between the first antenna frame and the second antenna frame, wherein the first antenna frame comprises:

a first radiator coupling part to which a first radiator is coupled; and a first support extending from the first radiator coupling part and supporting the first radiator coupling part, wherein an antenna coil is coupled to an outer circumferential surface of the first support, and the antenna coil is electrically connected to the first radiator, wherein the antenna coil includes a coil part, an upwardly extending part extending vertically from the coil part in an upward direction, and a downwardly extending part extending vertically from the coil part in a downward direction, and wherein a hole is formed in the first radiator coupling part, the upwardly extending part passes through the hole and protrudes above the first radiator coupling part, and the protruding upwardly extending part is coupled to the first radiator through soldering.

12. The multi-band shark fin antenna according to claim 11, wherein a through hole and a plurality of heat transfer prevention holes around the through hole are formed in a predetermined area of the first radiator.

13. The multi-band shark fin antenna according to claim 11, wherein the first antenna frame further includes a second support disposed on right side of the first support and coupled to the substrate, and a third support disposed on left side of the first support and coupled to the substrate.

14. The multi-band shark fin antenna according to claim 13, wherein a second radiator is coupled to one side of the second support, and a fixing protrusion is respectively formed on both sides of the second radiator.

15. The multi-band shark fin antenna according to claim 14, wherein a guide groove for inserting the second radiator is formed in the second support, and the fixing protrusion of the second radiator is supported by the guide groove.

16. The multi-band shark fin antenna according to claim 13, wherein a third radiator is coupled to one side of the third support.

17. The multi-band shark fin antenna according to claim 13, wherein a support leg extending in a direction parallel to the substrate is formed in at least one of the first support to the third support, and a screw hole is formed in the support leg.

18. The multi-band shark fin antenna according to claim 17, wherein a thickness of the support leg is the same as a thickness of the substrate, the substrate is removed from a contact area between the substrate and the support leg, and the support leg is inserted into a removed region of the substrate and then coupled to the base.

19. The multi-band shark fin antenna according to claim 11, wherein a fixing hook is formed at a lower portion of the first support, a lower end of the coil part has a straight structure, and a straight portion of the coil part is coupled to a groove of the fixing hook.

* * * * *